United States Patent [19]

Kazato

[11] Patent Number: 5,210,476

[45] Date of Patent: May 11, 1993

[54] SERVO MOTOR MONITORING UNIT

[75] Inventor: Hirohiko Kazato, Aichi, Japan

[73] Assignee: Mitsubishi Denki K.K., Tokyo, Japan

[21] Appl. No.: 717,143

[22] Filed: Jun. 18, 1991

[30] Foreign Application Priority Data

Jun. 19, 1990 [JP] Japan .................. 2-161097

[51] Int. Cl.[5] ............................. G05B 11/01
[52] U.S. Cl. .................... 318/560; 318/638
[58] Field of Search ............ 318/560, 567, 568.13, 318/568.16, 652, 628, 635, 636, 638, 639

[56] References Cited

U.S. PATENT DOCUMENTS

| | | | |
|---|---|---|---|
| 4,475,160 | 10/1984 | Inaba | 318/568 |
| 4,503,372 | 3/1985 | Nozawa et al. | 318/560 X |
| 4,549,261 | 10/1985 | Al Mouhamed | 318/652 X |
| 4,968,923 | 11/1990 | Busujima | 318/560 X |

FOREIGN PATENT DOCUMENTS

8805570  7/1988  PCT Int'l Appl. .
2006990  5/1979  United Kingdom .

Primary Examiner—William M. Shoop, Jr.
Assistant Examiner—Karen Masih
Attorney, Agent, or Firm—Sughrue, Mion, Zinn, Macpeak & Seas

[57] ABSTRACT

The invention relates to a monitor system for a servo controller used in connection with servo motors utilized in multivarious machines, such as machine tools. In addition to detecting a servo system fault when the difference between the commanded position and the actual position exceeds a predetermined value, the system monitors several servo system parameters to distinguish between different causes of servo faults. Identifying the source of the fault leads to improved maintenance and decreased system down time when a fault occurs.

13 Claims, 7 Drawing Sheets

SERVO MOTOR MONITORING UNIT

BACKGROUND OF THE INVENTION

1. Field of the Invention

This invention relates to a servo motor monitoring unit for monitoring a servo motor controller which drives a load, such as a machine tool, and more particularly to a servo motor monitoring unit with a fault detection and cause determination function.

2. Description of the Prior Art

In the prior art, there is known a troubleshooting unit for use with a motor controller (see Japanese Patent Disclosure Publication No. 291682 of 1989) which comprises a plurality of status observers for selectively monitoring control signals, e.g. voltage, current, speed and other signals, and estimating the disturbance torque of a motor in different modes. A fault location is guesstimated from the estimated values. Since such unit employs a plurality of status observers, the constants of the motor must be exactly known. In general, however, the motor constants are easily affected by individual differences and temperature, leading to errors. In addition, what is essential in controlling a servo motor is whether the actual position is tracking the position commands. For this purpose, it is necessary to continuously compare the position command and a position detection feedback signal incoming from a position detector, to provide an alarm such as "excessive error," "excessive deviation," or the like if the difference therebetween is larger than a predetermined threshold value, and to alert the operator to any fault. The above unit, however, does not monitor the position itself, which is an essential factor in monitoring a servo motor.

Figure 6:
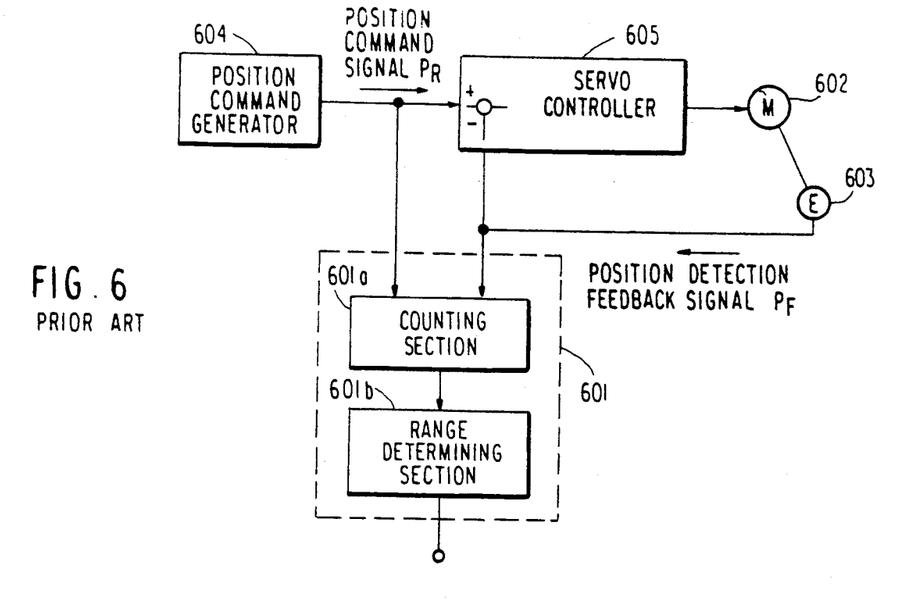
FIG. 6 illustrates a servo motor monitoring unit of the prior art.

On the other hand, there is also known prior art for monitoring position. As shown in FIG. 6, a servo motor monitoring unit 601 comprises a counting section 601a for receiving a position command signal $P_R$ and a position detection feedback signal $P_F$ and operating on a difference therebetween, and a range determining section 601b for determining fault if the difference obtained by the counting section 601a is greater than a predetermined threshold value, and outputting a fault alarm such as "excessive error." Referring to FIG. 6, numeral 602 indicates a servo motor, 603 a position detector for detecting the position of the servo motor 602, 604 a position command generator for outputting the position command signal, and 605 a servo controller for controlling the driving of the servo motor 602 in accordance with the position command signal $P_R$ and the position detection feedback signal $P_F$.

The operation of the unit configured as described above will now be described.

The servo controller 605 compares the position command signal $P_R$ output by the position command generator 604 and the position detector 603 and controls the drive current of the servo motor 602. The position detector 603 outputs the position detection feedback signal $P_F$ in accordance with the operation of the servo motor 602. In the servo motor control system as described above, the position detection feedback signal $P_F$ cannot track the position command signal $P_R$ when: (1) the load is too heavy to generate acceleration; (2) the polarity of the position detection feedback signal $P_F$ from the position detector 603 is reversed; and (3) electrical connections to the servo motor 602 are improper. In any of such cases ((1) to (3)), the servo motor monitoring unit 601 causes the counting section 601a to operate on the difference between the position command signal $P_R$ and the position detection feedback signal $P_F$, and causes the range determining section 601B to compare that difference with a predetermined threshold value, determine that a fault has occurred if the difference is larger than the threshold value, and output a fault alarm.

Figure 7:
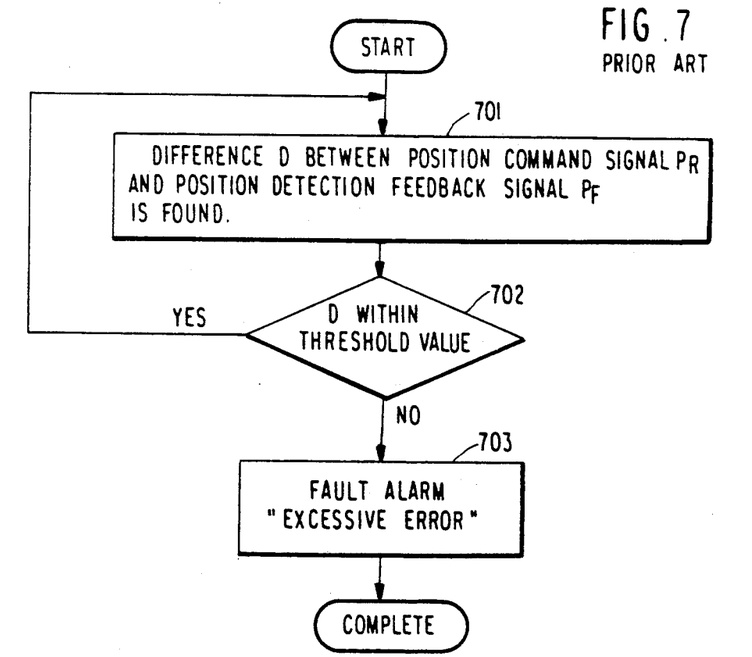
FIG. 7 is a flowchart of the operation of the servo motor monitoring unit of the prior art.

FIG. 7 is a flowchart illustrating the sequence of said operation. First, the difference D between the position command signal $P_R$ and the position detection feedback signal $P_F$ is found (step 701). Then, whether the difference D is within the range of the predetermined threshold value is determined (step 702). The fault alarm "excessive error" is output if the difference D is outside the threshold value range (step 703). On the other hand, if the difference D is within that range, the operation returns to step 701 and repeats processing.

The servo motor monitoring unit known in the art may be able to determine the occurrence of a fault in accordance with the difference D between the position command signal $P_R$ and the position detection feedback signal $P_F$, but cannot determine the cause thereof, i.e. it cannot determine whether the difference D has increased due to insufficient torque because the machine (load) is too heavy or has collided with an obstacle, or due to opposite servo because of incorrect connection to the servo motor, or because the feedback of the equipment has been connected reversely. Hence, when the fault alarm "excessive error" is output, the cause of the fault must be investigated, taking much time.

SUMMARY OF THE INVENTION

It is, accordingly, an object of the present invention to overcome the disadvantages in the prior art by providing a servo motor monitoring unit which allows the servo motor controller to be easily restored in a short time when the difference D between the position command signal $P_R$ and the position detection feedback signal $P_F$ is determined to be excessive.

DESCRIPTION OF THE PREFERRED EMBODIMENTS

An embodiment of a servo motor monitoring unit according to the present invention will now be described in detail with reference to the drawings.

Figure 1:
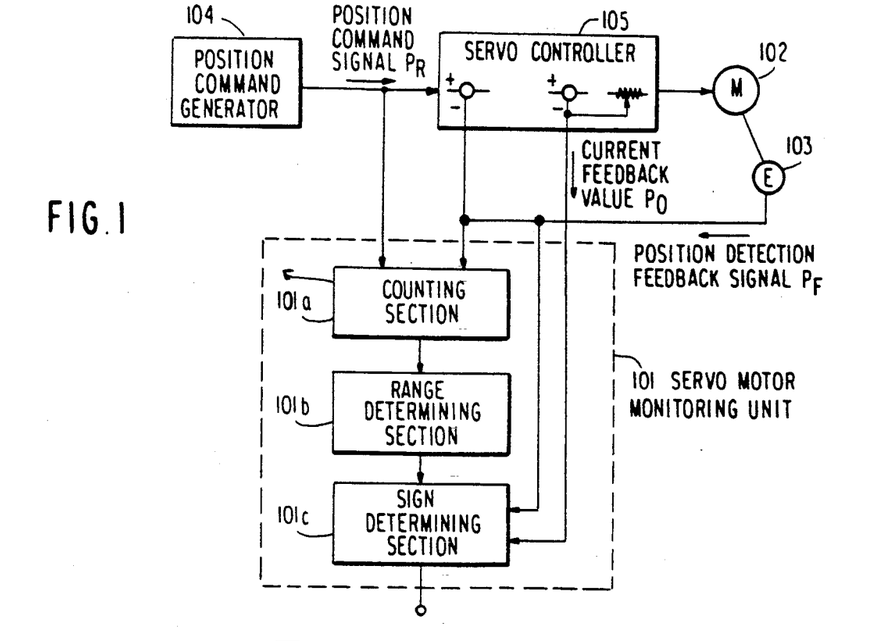
FIG. 1 illustrates a servo motor monitoring unit according to one embodiment of the present invention.

FIG. 1 illustrates the configuration of a servo system to which the servo motor monitoring unit 101 of the present invention has been applied. The servo motor monitoring unit 101 comprises a counting section 101a for receiving a position command signal $P_R$ and a position detection feedback signal $P_F$ and determining the difference D therebetween, a range determining section 101b for determining fault if the difference D obtained by the counting section 101a is greater than a predetermined threshold value, and a determining section 101c for determining the cause of fault occurrence in accordance with a sign of the position detection feedback signal $P_F$ (i.e., the sign of the acceleration of this signal) and that of a current feedback value $P_0$. In FIG. 1, numeral 102 indicates a servo motor; 103, a position detector for detecting the position of the servo motor 102; 104, a position command generator for outputting position command signals, and 105, a servo controller for controlling the power delivered to the servo motor 102 in accordance with the position command signal $P_R$ and the position detection feedback signal $P_F$.

The operation of the servo motor monitoring unit according to the present embodiment configured as described above will now be described in greater detail.

Referring to FIG. 1, the servo controller 105 compares the position command signal $P_R$ output by the position command generator 104 and the position detection feedback signal $P_F$ output by the position detector 103 to control the current used in driving the servo motor 102. As the servo motor 102 runs, the position detector 103 outputs the position detection feedback signal $P_F$ accordingly. In the meantime, the servo motor monitoring unit 101 causes the counting section 101a to determine the difference between the position command signal $P_R$ and the position detection feedback signal $P_F$, causes the range determining section 101B to compare that difference with a predetermined threshold value, and determines the occurrence of fault if the difference is larger than the threshold value. Further, the determining section 101c compares the sign b of the acceleration of the position detection feedback signal $P_F$ and that of the current feedback value $P_0$, and determines the cause of the excessive position error as "insufficient torque" if the signs match, or "opposite servo" if the signs do not match.

Figure 2:
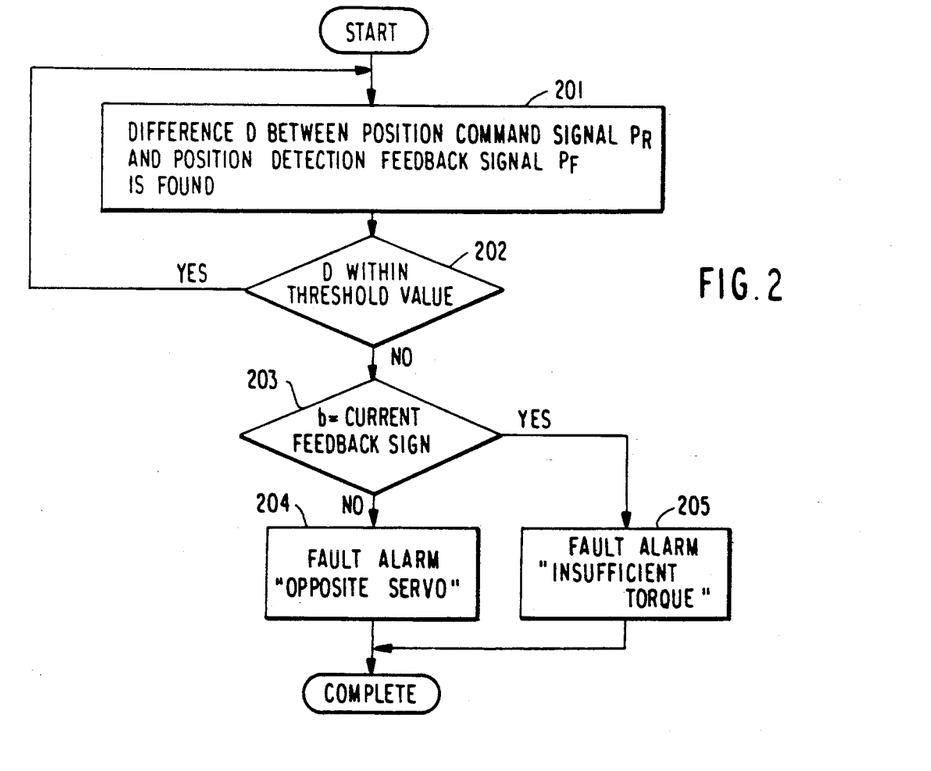
FIG. 2 is a flowchart of the operation for the servo motor monitoring unit of one embodiment of the present invention.

FIG. 2 is a flowchart illustrating the sequence of the above operation. First, the difference D between the position command signal $P_R$ and the position detection feedback signal $P_F$ is found (step 201). Then, whether the difference D is within a given range of a predetermined threshold value (determination value) or not is determined (step 202), and the sign b of the acceleration of the position detection feedback signal $P_F$ is compared with the current feedback sign (sign of the current feedback value $P_0$) if the difference D is outside the threshold value range (step 203). If the above signs do not match, an "opposite servo" fault alarm is output (step 204), or if they match, an "insufficient torque" fault alarm is output (step 205). On the other hand, if the difference D is within the threshold value range, the operation returns to step 201 and repeats processing.

The basis for determining "insufficient torque" and "opposite servo" in the sign determining section 101C will now be described with reference to graphs shown in FIGS. 3, 4 and 5.

Figure 3:
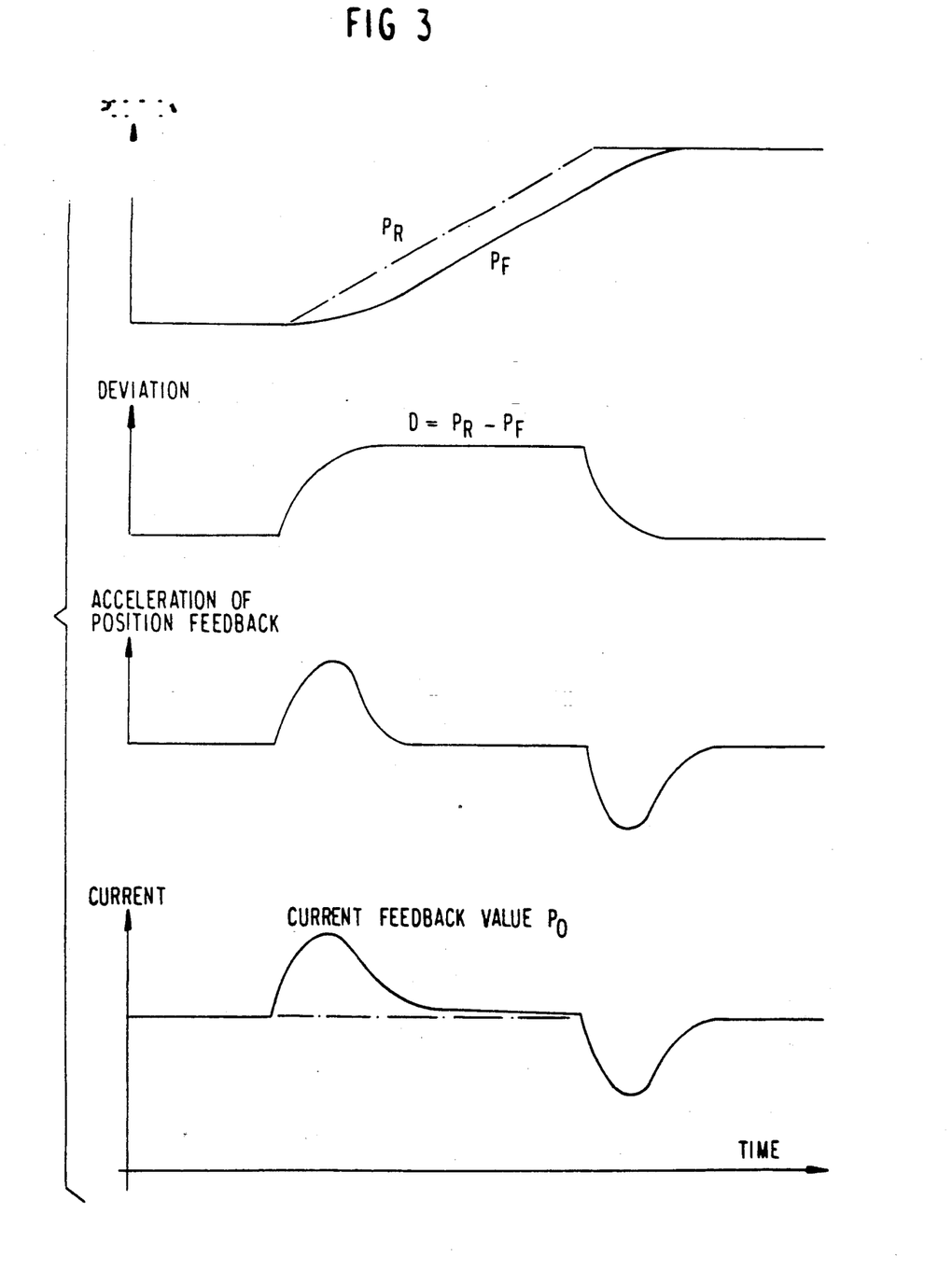
FIG. 3 is a timing chart of a servo control system during normal operation.

FIG. 3 illustrates the waveforms of the output signals (position command signal $P_R$, position detection feedback signal $P_F$ and current feedback value $P_0$) provided by the corresponding portions of the servo control system when operating without fault, and also shows the acceleration of the position feedback signal. Note that the above embodiment assumes that a positive current flows when the servo motor accelerates in the forward direction. The top graph in FIG. 3 gives the relationship between the position command signal $P_R$ and position detection feedback signal $P_F$, the next graph indicates the difference therebetween, and the bottom graph indicates the change in the current feedback value $P_0$.

Figure 4:
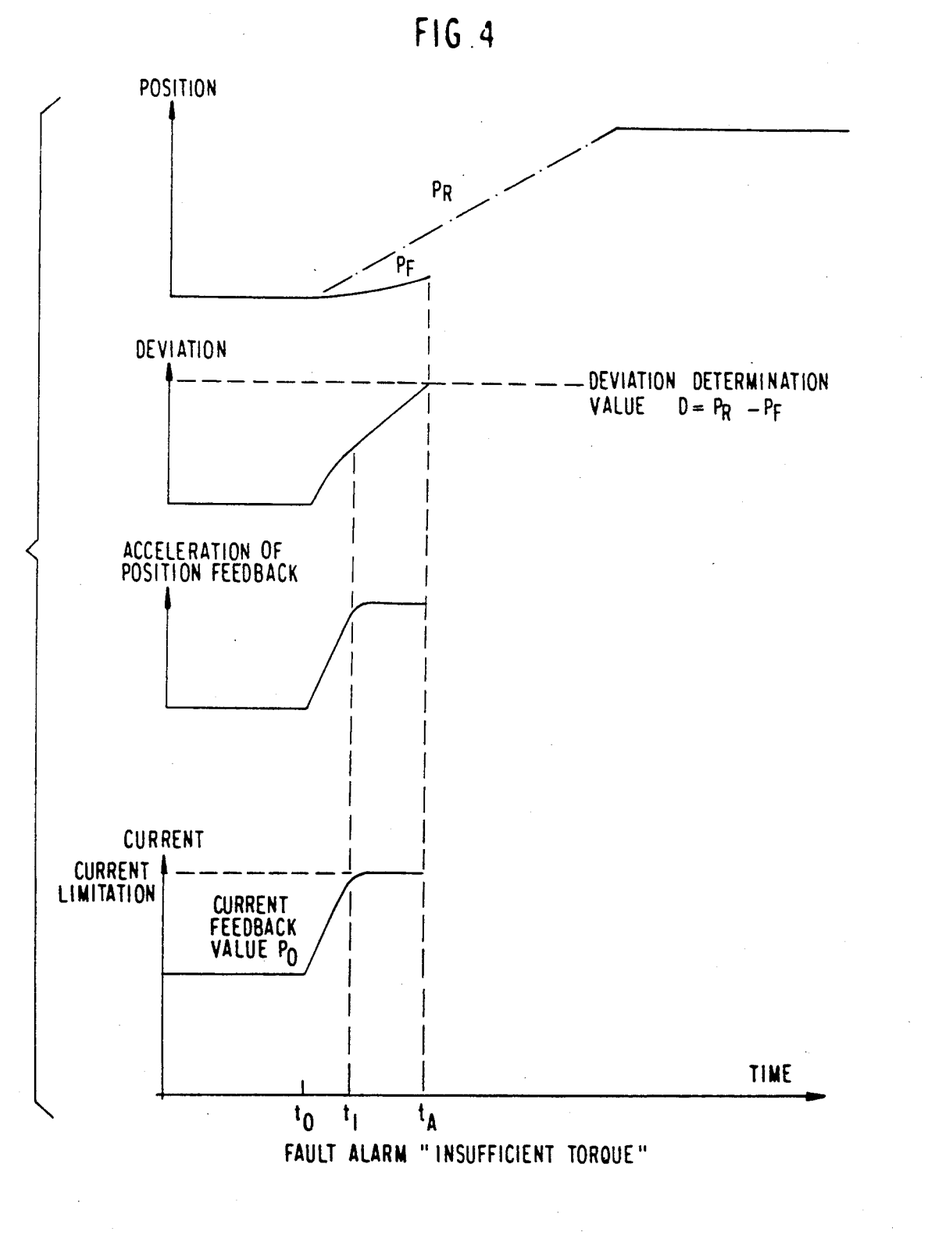
FIG. 4 is a timing chart of a servo control system when the torque is insufficient.

FIG. 4 provides an example of "insufficient torque," wherein acceleration is initiated at $t_0$, but due to a current limitation at $t_1$, the position detection feedback signal $P_F$ cannot track the position command signal $P_R$ normally, and the difference D therebetween exceeds the threshold value at $t_4$, resulting in a fault alarm. Since the sign of the position detection feedback signal (i.e., the sign of the acceleration of this signal) matches that of the current feedback value $P_0$ in this case, the cause of the fault can be determined as "insufficient torque".

Figure 5:
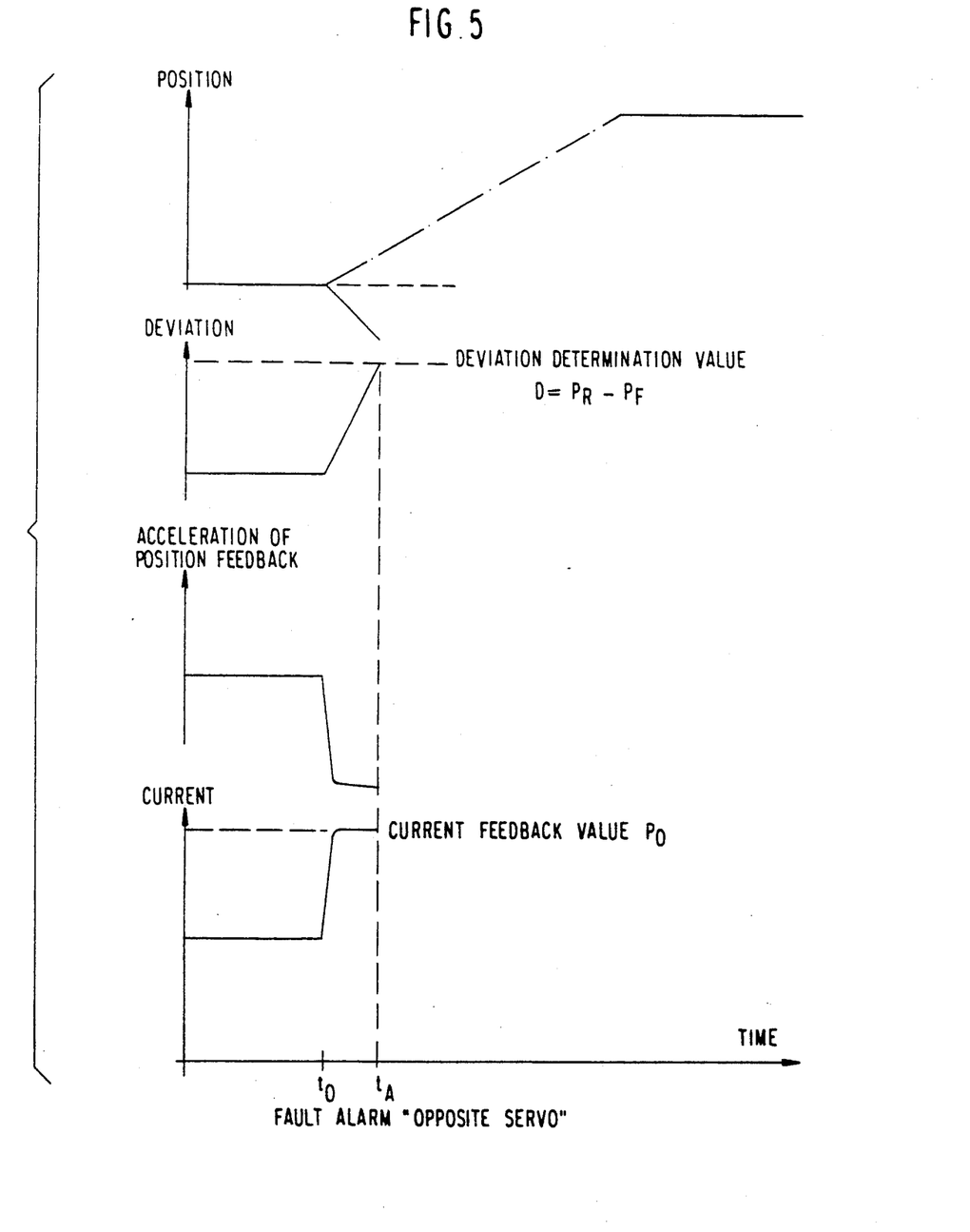
FIG. 5 is a timing chart of the servo control system when servo is opposite.

FIG. 5 indicates an example of "opposite servo," wherein the position command signal $P_R$ has been output at $t_0$, but the motor runs abnormally in a direction opposite to the command of the position command signal $P_R$ due to positive feedback caused by opposite servo, and the difference D exceeds the threshold value, resulting in a fault alarm. Since the sign of the position detection feedback signal (i.e., the sign of the acceleration of this signal) does not match that of the current feedback value $P_0$ in this case, the cause of the fault can be determined as "opposite servo". In the above embodiment, it has been assumed that positive current feedback (i.e. the current feedback value $P_0$ is positive) flows when the motor is accelerated in the forward direction. When the opposite assumption is made, it will be appreciated that the cause of the fault will be determined as "opposite servo" if the position detection feedback signal sign a matches the current feedback value $P_0$ sign, and as "insufficient torque" if they do not match.

In the present embodiment, inability to accelerate the servo motor due to a heavy machine load is not differentiated from collision of the machine with an obstacle and both are determined as "insufficient torque."

Figure 2A:
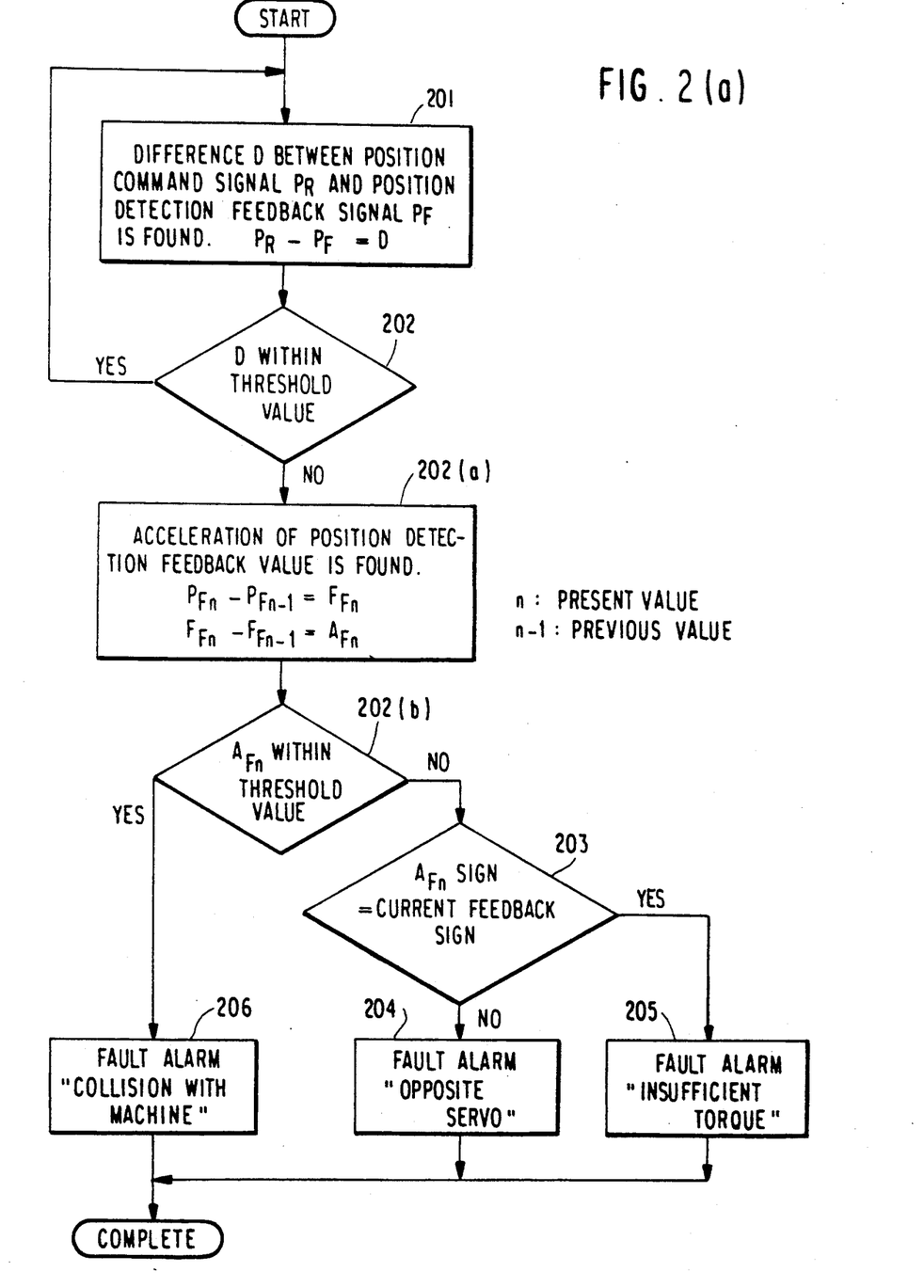
FIG. 2(a) is a flowchart illustrating operations in an alternative embodiment.
Figure 8:
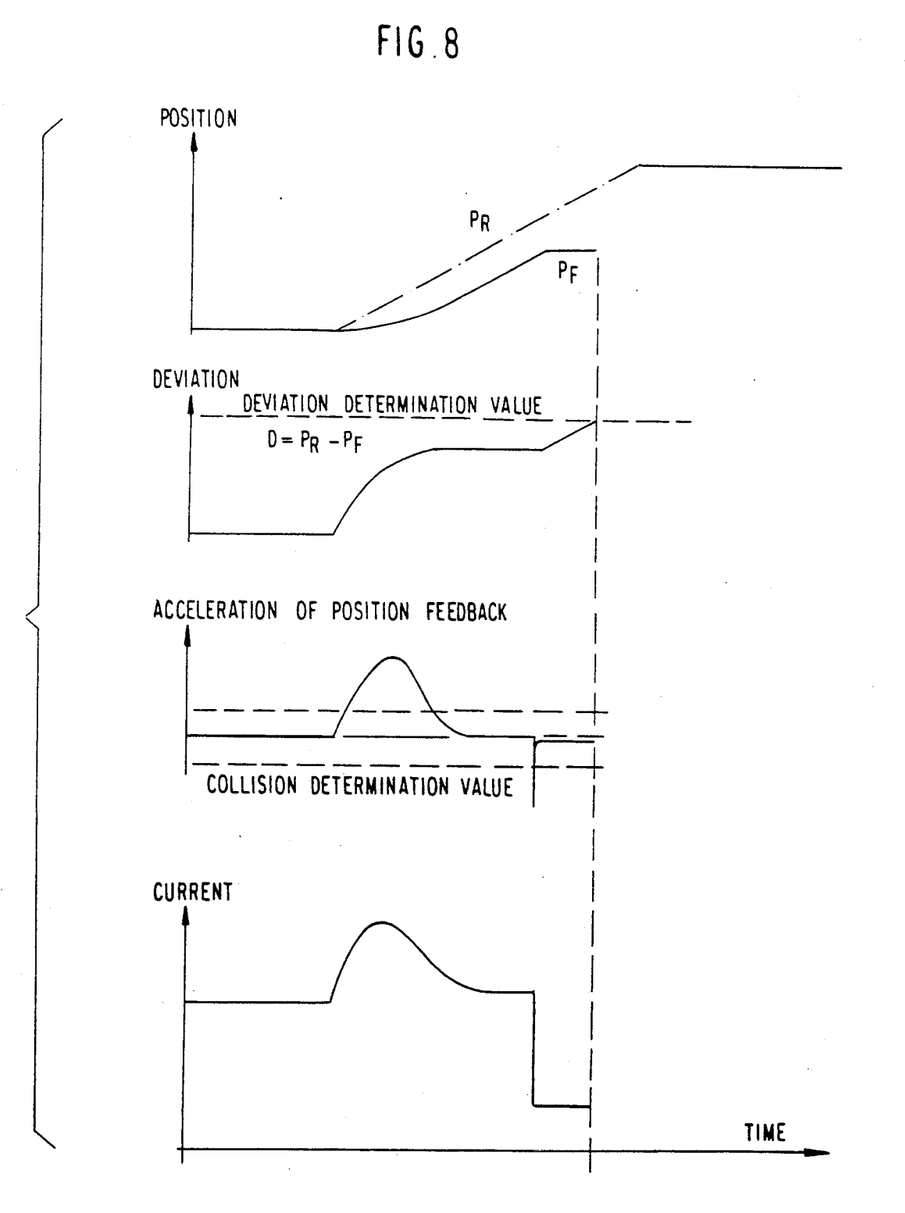
FIG. 8 is a timing chart illustrating the servo control system when the controlled machine has collided with an object.

Since the acceleration of the position detection feedback signal suddenly drops toward zero at the time of collision, it is also possible to distinguish "machine collision" from other "insufficient torque" situations if the acceleration value falls below a certain threshold value. A flowchart showing the operation of this alternative is shown in FIG. 2(a), and a timing chart is depicted in FIG. 8. In this example, the possibility of collision is checked by calculating the acceleration value within the difference detection routine (see step 202(a)), and branching at step 202(b) if the acceleration falls below a given threshold. In this instance, machine collision is discriminated and a "machine collision" fault alarm is raised. The flowchart of FIG. 2(a) is otherwise the same as that of FIG. 2. That, is, if the acceleration has not dropped, comparison of the acceleration sign with that of the current feedback is carried out at step 203. In this alternative embodiment, determining section 101c performs the additional function of acceleration value threshold comparison.

It will be apparent that the invention, as described above, achieves a servo motor monitoring unit including fault determining means for determining a fault in servo motor operating status and the cause of the fault in accordance with a position command signal, a position detection feedback signal and the feedback value of motor current supplied to said servo motor. The monitoring unit therefore allows the servo motor controller to be easily restored within a short period when the difference D between the position command signal $P_R$ and position detection feedback signal $P_F$ becomes excessive. In other words, the servo motor monitoring unit provides quick troubleshooting at occurrence of any fault, ensuring improved maintenance performance.

What is claimed is:

1. A servo motor monitoring unit for monitoring a servo motor controller which controls a servo motor in accordance with a position command signal and a position detection feedback signal from a position detector for detecting the position of the servo motor, said monitoring unit comprising:

first fault determining means for determining fault in servo motor operating status; and second fault determining means for determining the cause of that fault in accordance with said position command signal, said position detection signal, and the feedback value of a motor current supplied to said servo motor.

2. A servo motor monitoring device, comprising:

means for monitoring a position of said servo motor, and for generating a position detection signal;

means for detecting a difference between a position command signal issued from a position command generator to a servo controller for said servo motor and said position detection signal;

means for comparing said difference with a predetermined range of acceptable difference values, and, when said difference is outside of said range, generating a fault signal indicative of a fault; and determining means responsive to said fault signal for determining the cause of said fault.

3. A servo motor monitoring device, comprising:

a means for monitoring a position said servo motor, and for generating a position detection signal;

means for detecting a difference between a position command signal issued from a position command generator to a servo controller for said servo motor and said position detection signal;

means for comparing said difference with a predetermined range of acceptable difference values, and, when said difference is outside of said range, generating a fault signal indicative of a fault; and determining means responsive to said fault signal for determining the cause of said fault, wherein said determining means comprises means for monitoring at least said position detection signal and a current feedback value generated by said servo controller, and for discriminating between a heavy load condition and a reverse servo condition by detecting and comparing the sign of the acceleration of said position detection signal with the sign of said current feedback signal.

4. A servo motor monitoring device comprising:

means for monitoring a position of said servo motor, and for generating a position detection signal;

means for detecting a difference between a position command signal issued from a position command generator to a servo controller for said servo motor and said position detection signal;

means for comparing said difference with a predetermined range of acceptable difference values, and, when said difference is outside of said range, generating a fault signal indicative of a fault; and determining means responsive to said fault signal for determining the cause of said fault, wherein said servo motor is used to control the position of at least one movable element of a machine, and wherein said determining means comprises means for monitoring at least said position detection signal and a current feedback value generated by said servo controller, and for discriminating between a heavy load condition and a machine collision condition by detecting a sudden drop in the acceleration of said position detecting signal.

5. A servo motor monitoring device comprising:

means for monitoring a position of said servo motor, and for generating a position detection signal;

means for detecting a difference between a position command signal issued from a position command generator to a servo controller for said servo motor and said position detection signal;

means for comparing said difference with a predetermined range of acceptable difference values, and, when said difference is outside of said range, generating a first signal indicative of a fault; and determining means responsive to said first signal for determining the cause of said fault, said determining means distinguishing between at least faults due to excessive load on said servo motor and faults due to a misconnected or reverse servo.

6. A device as claimed in claim 5, wherein said servo motor is used to control the position of at least one movable element of a machine, and wherein said determining means comprises means for monitoring at least said position detection signal and a current feedback value generated by said servo controller, and for discriminating between a heavy load condition and a machine collision condition by detecting a rapid drop in the acceleration of said position detection signal.

7. A method of monitoring a servo motor which is controlled in accordance with a position command signal and a feedback position detection signal indicating the position of the servo motor, the method comprising the steps of:

determining a fault in operating status of the servo motor; and determining the cause of that fault in accordance with said position command signal, said position detection signal, and the feedback value of a motor current supplied to said servo motor.

8. A method of monitoring a servo motor which is controlled in accordance with a position command signal and a feedback position detection signal indicating the position of the servo motor, the method comprising the steps of:

detecting a difference between said position command signal and said position detection signal;

comparing said difference with a predetermined range of acceptable difference values, and, in response to a determination that said difference is outside of said range, generating a fault signal indicative of a fault; and determining the cause of that fault in response to said fault signal.

9. A method of monitoring a servo motor as recited in claim 8, wherein said determining step comprises the steps of:

monitoring at least said position detection signal and a current feedback value generated by said servo controller; and discriminating between a heavy load condition and a reverse servo condition by detecting and comparing the sign of the acceleration of said position detection signal with the signal of said current feedback signal.

10. A method of monitoring a servo motor as recited in claim 8, wherein said servo motor is used to control the position of at least one movable element of a machine, and wherein said determining step comprises the steps of:

monitoring at least said position detection signal and a current feedback value generated by said servo controller; and discriminating between a heavy load condition and a machine collision condition by detecting a sudden drop in the acceleration of said position detection signal.

11. A method of monitoring a servo motor which is controlled in accordance with a position command signal and a feedback position detection signal indicating the position of the servo motor, the method comprising the steps of:

detecting a difference between said position command signal and said position detection signal;

comparing said difference with a predetermined range of acceptable difference values, and, in response to a determination that said difference is outside of said range, generating a fault signal indicative of a fault; and determining the cause of that fault in response to said fault signal and distinguishing between at least faults due to excessive load on said servo motor and faults due to a misconnected or reverse servo.

12. A method of monitoring a servo motor as recited in claim 11, wherein said servo motor is used to control the position of at least one movable element of a machine, and wherein said determining step comprises the steps of:

monitoring at least said position detection signal and a current feedback value generated by said servo controller; and discriminating between a heavy load condition and a machine collision condition by detecting a rapid drop in the acceleration of said position detection signal.

13. A monitoring unit for use with a servo controller, the servo controller controlling a servo motor in accordance with a position command signal output from a position command generator, a position detection signal output from a position detector, and a current feedback value output from the servo controller, the monitoring unit comprising:

a counting section coupled to the position command generator and the position detector so as to receive both the position command signal and the position detection signal respectively output from the position command generator and the position detector, and counting section generating an error signal representing a difference between the position command signal and the position detection signal;

range determining section coupled to said counting section so as to receive said error signal generated by said counting section, said range determining section generating a fault signal when said error signal represents a difference between the position command signal and the position detection signal that is outside a reference range stored in said range determining section; and sign determining section coupled to the servo controller and the position detector so as to receive the current feedback value and the position detection signal, wherein in response to said fault signal said sign determining section determines the cause of a servo motor fault indicated by said fault signal, said sign determining section generating a condition signal distinguishing among at least a heavy load condition, a machine collision condition, a misconnected servo condition, and a reverse servo condition.

* * * * *